(12) United States Patent
Li et al.

(10) Patent No.: US 10,440,077 B2
(45) Date of Patent: Oct. 8, 2019

(54) METHOD AND APPARATUS FOR MEDIA STREAM TRANSMISSION, AND USER EQUIPMENT

(71) Applicant: HUAWEI TECHNOLOGIES CO., LTD., Shenzhen (CN)

(72) Inventors: Zhiming Li, Shanghai (CN); Anni Wei, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 489 days.

(21) Appl. No.: 15/058,436

(22) Filed: Mar. 2, 2016

(65) Prior Publication Data
US 2016/0182586 A1 Jun. 23, 2016

Related U.S. Application Data

(63) Continuation of application No. PCT/CN2013/082883, filed on Sep. 3, 2013.

(51) Int. Cl.
*H04L 29/06* (2006.01)
*H04W 72/00* (2009.01)
*H04W 4/06* (2009.01)
*H04L 29/08* (2006.01)

(52) U.S. Cl.
CPC ...... *H04L 65/4076* (2013.01); *H04L 65/4084* (2013.01); *H04L 65/608* (2013.01); *H04L 67/02* (2013.01); *H04W 4/06* (2013.01); *H04W 72/005* (2013.01)

(58) Field of Classification Search
CPC ............. H04L 65/4076; H04L 65/4084; H04L 65/608; H04L 67/02; H04W 4/06; H04W 72/005

USPC ........................................................ 709/219
See application file for complete search history.

(56) References Cited

U.S. PATENT DOCUMENTS

| | | |
|---|---|---|
| 2009/0077247 A1 | 3/2009 | Bouazizi et al. |
| 2012/0158983 A1* | 6/2012 | Glasser ............... H04L 67/1008 709/230 |
| 2012/0269110 A1 | 10/2012 | Walker et al. |
| 2013/0007293 A1 | 1/2013 | Den Hartog et al. |
| 2013/0007814 A1 | 1/2013 | Cherian et al. |
| 2013/0128756 A1 | 5/2013 | Zhang et al. |

(Continued)

FOREIGN PATENT DOCUMENTS

| | | |
|---|---|---|
| CN | 101743717 A | 6/2010 |
| WO | 2013/022470 A1 | 2/2013 |

OTHER PUBLICATIONS

3GPP, 3rd Generation Partnership Project: Technical Specification Group Services and Aspects; Sep. 2012; www.3GPP.org.*

(Continued)

*Primary Examiner* — Zi Ye
(74) *Attorney, Agent, or Firm* — Staas & Halsey LLP

(57) ABSTRACT

The present invention discloses a method and an apparatus for media stream transmission, and user equipment. According to the method and the apparatus for media stream transmission, and the user equipment in embodiments of the present invention, same media content, of multiple users, on unicast bearers is multicast by using an MBMS channel, so that a backhaul network resource and an air interface resource that is of a base station can be saved, thereby reducing costs for transmitting a media stream.

18 Claims, 8 Drawing Sheets

(56) References Cited

U.S. PATENT DOCUMENTS

| | | | | |
|---|---|---|---|---|
| 2013/0294321 | A1* | 11/2013 | Wang | H04W 4/06 370/312 |
| 2014/0376440 | A1* | 12/2014 | Oyman | H04W 72/0413 370/312 |

OTHER PUBLICATIONS

Uttam Kumar, Multicasting-Advantages and Disadvantages, Apr. 29, 2011, www.startnetworks.info, http://www.startnetworks.info/2011/04/multicasting-advantages-and.html.*

"3$^{rd}$ Generation Partnership Project; Technical Specification Group Services and System Aspects; Multimedia Broadcast/Multicast Service (MBMS); Protocols and codecs (Release 12)," 3GPP TS 26.346, V11.5.0, Jun. 2013, 168 pgs.

International Search Report dated Jun. 4, 2014 in corresponding International Patent Application No. PCT/CN2013/082883.

Extended European Search Report dated Jul. 7, 2016 in corresponding European Patent Application No. 13892854.4.

"3rd Generation Partnership Project; Technical Specification Group Radio Access Network; Evolved Universal Terrestrial Radio Access (E-UTRA); Packet Data Convergence Protocol (PDCP) specification(Release 11)", 3GPP TS 36.323 V11.2.0, 3GPP Organizational Partners, Mar. 2013, Valbonne, France, 27 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 11)", 3GPP TS 36.300 V11.6.0, 3GPP Organizational Partners, Jun. 2013, Valbonne, France, 209 pages.

"3$^{rd}$ Generation Partnership Project; Technical Specification Group Services and System Aspects; Multimedia Broadcast/Multicast Service (MBMS); Enhanced MBMS Operation (Release 12)", 3GPP TR 26.848 V0.4.0, 3GPP Organizational Partners, Jul. 2013, Valbonne, France, 18 pages.

"3$^{rd}$ Generation Partnership Project; Technical Specification Group Services and System Aspects; Multimedia Broadcast/Multicast Service (MBMS); Protocols and codecs (Release 10)", 3GPP TS 26.346 V10.8.0, 3GPP Organizational Partners, Jun. 2013, Valbonne, France, 156 pages.

Chinese Search Report dated Jan. 21, 2017 in corresponding Chinese Patent Application No. 201380004586.2.

Chinese Office Action dated Feb. 4, 2017 in corresponding Chinese Patent Application No. 201380004586.2.

International Search Report dated Jun. 4, 2014 in corresponding International Application No. PCT/CN2013/082883.

Korean Office Action dated Jun. 30, 2017 in corresponding Korean Patent Application No. 10-2016-7008360.

* cited by examiner

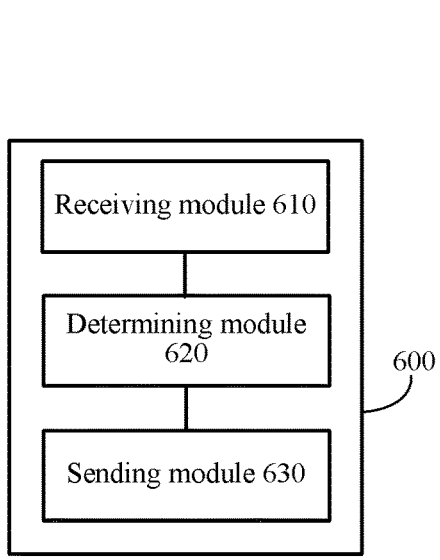
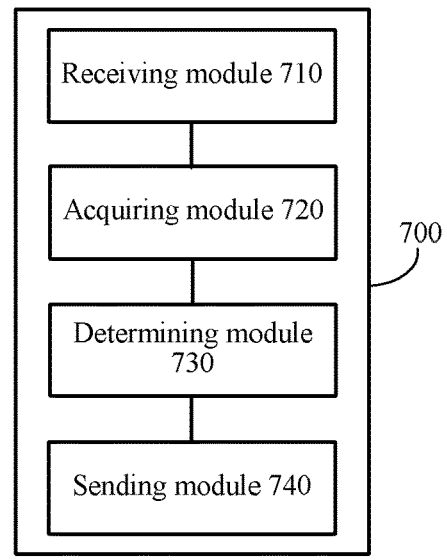
FIG. 9              FIG. 10
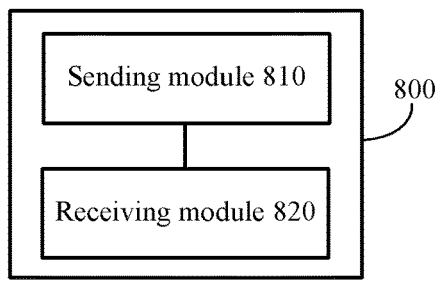
FIG. 11
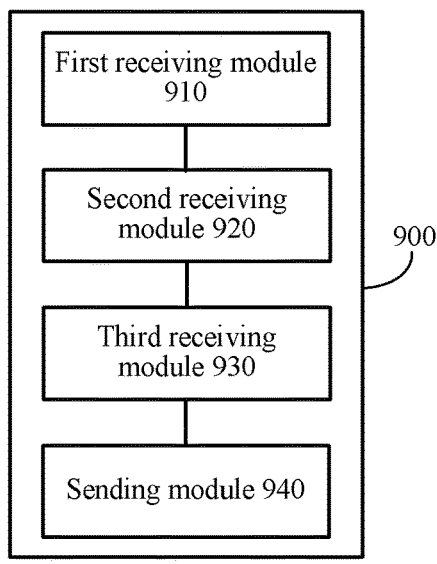
FIG. 12

METHOD AND APPARATUS FOR MEDIA STREAM TRANSMISSION, AND USER EQUIPMENT

CROSS-REFERENCE TO RELATED APPLICATIONS

This application is a continuation of International Patent Application No. PCT/CN2013/082883, filed on Sep. 3, 2013, which is hereby incorporated by reference in its entirety.

TECHNICAL FIELD

Embodiments of the present invention relate to the communications field, and in particular, to a method and an apparatus for media stream transmission, and user equipment.

BACKGROUND

To resolve a problem that in a mobile communication process, channel fluctuation results in that streaming media transmission cannot be ensured, researchers propose a dynamic adaptive steaming over Hypertext Transfer Protocol (DASH) technology. Generally, a streaming media unicast process based on the DASH technology is as follows: A content preparation (Content Preparation) party segments content of media and generates a media presentation description (Media Presentation Description, "MPD" for short) of the media, and then publishes segment content of the media and the MPD of the media to a content server; when receiving a segment request message that is sent by a DASH client and that is used to request segment content of the media, the content server sends, to the DASH client by using a response message, the segment content requested by the segment request message; and after receiving the segment content, the DASH client locally plays the segment content, and while playing the segment content, the DASH client may request next segment content of the media from the content server. The foregoing process repeats cyclically until playback of the media is completed or a user stops viewing the media.

However, as network technologies are rapidly progressed and widely popularized, a scenario in which multiple users on a same network request a same media resource often occurs, for example, on-demand playback of a currently hot film or hot competition event. If media services requested by all users are transmitted in a unicast mode, a large quantity of transmission resources are inevitably wasted. How a network centrally controls and manages requests of multiple users for a same media service to save a precious transmission resource is a problem to be urgently resolved by a network operator currently.

SUMMARY

Embodiments of the present invention provide a method and an apparatus for media stream transmission, and user equipment, which can save a network resource.

According to a first aspect, a method for media stream transmission is provided, including: receiving a segment request message that is sent by a dynamic adaptive steaming over Hypertext Transfer Protocol DASH client of user equipment UE and that is used to request segment content of media; determining, according to the segment request message, to send the segment content to the UE in a multicast mode; and sending a multicast request message to a broadcast multicast service center BM-SC, so that the BM-SC multicasts the segment content to a multimedia broadcast multicast service MBMS client according to the multicast request message, and the MBMS client sends the segment content to the DASH client.

With reference to the first aspect, in a first possible implementation manner, the method further includes: receiving multicast transmission information, sent by the BM-SC according to the multicast request message, of the segment content; and sending a segment multicast instruction message to the DASH client, where the segment multicast instruction message carries the multicast transmission information, and the segment multicast instruction message is used to instruct the DASH client to receive the segment content by using the MBMS client.

With reference to the first possible implementation manner of the first aspect, in a second possible implementation manner, the multicast transmission information includes at least one of the following information: information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

With reference to the first aspect or with reference to the first or second possible implementation manner of the first aspect, in a third possible implementation manner, the determining, according to the segment request message, to send the segment content to the UE in a multicast mode includes: when a quantity of received segment request messages used to request segment content of the media exceeds a preset threshold, determining to send the segment content to the UE in a multicast mode.

With reference to the first aspect or with reference to any possible implementation manner of the first to third possible implementation manners of the first aspect, in a fourth possible implementation manner, the multicast request message carries: identifier information of the segment content, used by the BM-SC to determine the segment content; information about the UE, used by the BM-SC to determine an object to which the segment content is multicast; and a media presentation description MPD of the media, used by the BM-SC to determine a user service description USD and file delivery table FDT instance information of the media.

With reference to the first aspect or with reference to any possible implementation manner of the first to fourth possible implementation manners of the first aspect, in a fifth possible implementation manner, the method further includes: sending the segment content to the BM-SC, so that the BM-SC multicasts the segment content according to the multicast request message.

According to a second aspect, another method for media stream transmission is provided, including: receiving a multicast request message that is sent by a dynamic adaptive steaming over Hypertext Transfer Protocol DASH proxy when the DASH proxy receives a segment request message that is sent by a DASH client of user equipment UE and that is used to request segment content of media, where the multicast request message is used to request a broadcast multicast service center BM-SC to multicast the segment content of the media to a multimedia broadcast multicast service MBMS client of the UE; acquiring the segment content according to the multicast request message; determining a user service description USD and file delivery table FDT instance information of the media according to the multicast request message; and sending the USD and the FDT instance information to the MBMS client, and multicasting the segment content to the MBMS client, so that the MBMS client receives the segment content according to the USD and the FDT instance information.

With reference to the second aspect, in a first possible implementation manner, before the multicasting the segment content to the MBMS client, the method further includes: determining multicast transmission information of the segment content; and sending the multicast transmission information to the DASH proxy, so that the DASH proxy sends the multicast transmission information to the DASH client, and the DASH client uses the multicast transmission information to request the segment content from the MBMS client.

With reference to the first possible implementation manner of the second aspect, in a second possible implementation manner, the multicast transmission information includes at least one of the following information: information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

With reference to the second aspect or with reference to the first or second possible implementation manner of the second aspect, in a third possible implementation manner, the multicast request message carries: identifier information of the segment content, used by the BM-SC to determine the segment content; information about the UE, used by the BM-SC to determine an object to which the segment content is multicast; and a media presentation description MPD of the media, used by the BM-SC to determine a user service description USD and file delivery table FDT instance information of the media.

With reference to the second aspect or with reference to any possible implementation manner of the first to third possible implementation manners of the second aspect, in a fourth possible implementation manner, the acquiring the segment content includes: receiving the segment content sent by the DASH proxy.

With reference to the second aspect or with reference to any possible implementation manner of the first to third possible implementation manners of the second aspect, in a fifth possible implementation manner, the multicast request message carries address information of the segment content; and the acquiring the segment content according to the multicast request message includes: acquiring the segment content from an address that corresponds to the address information of the segment content.

According to a third aspect, another method for media stream transmission is provided, including: sending, by a dynamic adaptive steaming over Hypertext Transfer Protocol DASH client, to a DASH proxy, a segment request message used to request segment content of media; receiving a segment multicast instruction message that is sent by the DASH proxy according to the segment request message, where the segment multicast instruction message carries multicast transmission information of the segment content, and the segment multicast instruction message is used to instruct the DASH client to receive the segment content by using a multimedia broadcast multicast service MBMS client; sending a segment transfer request message to the MBMS client according to the segment multicast instruction message, where the segment transfer request message carries the multicast transmission information; and receiving the segment content sent by the MBMS client according to the segment transfer request message.

With reference to the third aspect, in a first possible implementation manner, the multicast transmission information includes at least one of the following information: information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

According to a fourth aspect, another method for media stream transmission is provided, including: receiving a user service description USD and file delivery table FDT instance information of media that are sent by a broadcast multicast service center BM-SC; receiving segment content of the media according to the USD and the FDT instance information; receiving a segment transfer request message sent by a dynamic adaptive steaming over Hypertext Transfer Protocol DASH client, where the segment transfer request message carries multicast transmission information of the segment content; and sending the segment content to the DASH client according to the multicast transmission information.

With reference to the fourth aspect, in a first possible implementation manner, the multicast transmission information includes at least one of the following information: information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

According to a fifth aspect, an apparatus for media stream transmission is provided, including: a receiving module, configured to receive a segment request message that is sent by a dynamic adaptive steaming over Hypertext Transfer Protocol DASH client of user equipment UE and that is used to request segment content of media; a determining module, configured to determine, according to the segment request message received by the receiving module, to send the segment content to the UE in a multicast mode; and a sending module, configured to send a multicast request message to a broadcast multicast service center BM-SC, so that the BM-SC multicasts the segment content to a multimedia broadcast multicast service MBMS client according to the multicast request message, and the MBMS client sends the segment content to the DASH client.

With reference to the fifth aspect, in a first possible implementation manner, the receiving module is further configured to receive multicast transmission information, sent by the BM-SC according to the multicast request message, of the segment content; and the sending module is further configured to send a segment multicast instruction message to the DASH client, where the segment multicast instruction message carries the multicast transmission information received by the receiving module, and the segment multicast instruction message is used to instruct the DASH client to receive the segment content by using the MBMS client.

With reference to the first possible implementation manner of the fifth aspect, in a second possible implementation manner, the multicast transmission information received by the receiving module includes at least one of the following information: information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

With reference to the fifth aspect or with reference to the first or second possible implementation manner of the fifth aspect, in a third possible implementation manner, the determining module is specifically configured to: when a quantity of segment request messages that are received by the receiving module and that are used to request segment content of the media exceeds a preset threshold, determine to send the segment content to the UE in a multicast mode.

With reference to the fifth aspect or with reference to any possible implementation manner of the first to third possible implementation manners of the fifth aspect, in a fourth possible implementation manner, the multicast request message carries: identifier information of the segment content, used by the BM-SC to determine the segment content; information about the UE, used by the BM-SC to determine an object to which the segment content is multicast; and a media presentation description MPD of the media, used by the BM-SC to determine a user service description USD and file delivery table FDT instance information of the media.

With reference to the fifth aspect or with reference to any possible implementation manner of the first to fourth possible implementation manners of the fifth aspect, in a fifth possible implementation manner, the sending module is further configured to send the segment content to the BM-SC, so that the BM-SC multicasts the segment content according to the multicast request message.

According to a sixth aspect, another apparatus for media stream transmission is provided, including: a receiving module, configured to receive a multicast request message that is sent by a dynamic adaptive steaming over Hypertext Transfer Protocol DASH proxy when the DASH proxy receives a segment request message that is sent by a DASH client of user equipment UE and that is used to request segment content of media, where the multicast request message is used to request a broadcast multicast service center BM-SC to multicast the segment content of the media to a multimedia broadcast multicast service MBMS client of the UE; an acquiring module, configured to acquire the segment content according to the multicast request message received by the receiving module; a determining module, configured to determine a user service description USD and file delivery table FDT instance information of the media according to the multicast request message received by the receiving module; and a sending module, configured to send the USD and the FDT instance information that are determined by the determining module to the MBMS client, and multicast, to the MBMS client, the segment content acquired by the acquiring module, so that the MBMS client receives the segment content according to the USD and the FDT instance information.

With reference to the sixth aspect, in a first possible implementation manner, the determining module is further configured to: before the sending module multicasts the segment content to the MBMS client, determine multicast transmission information of the segment content; and the sending module is further configured to send the multicast transmission information determined by the determining module to the DASH proxy, so that the DASH proxy sends the multicast transmission information to the DASH client, and the DASH client uses the multicast transmission information to request the segment content from the MBMS client.

With reference to the first possible implementation manner of the sixth aspect, in a second possible implementation manner, the multicast transmission information determined by the determining module includes at least one of the following information: information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

With reference to the sixth aspect or with reference to the first or second possible implementation manner of the sixth aspect, in a third possible implementation manner, the multicast request message carries: identifier information of the segment content, used by the BM-SC to determine the segment content; information about the UE, used by the BM-SC to determine an object to which the segment content is multicast; and a media presentation description MPD of the media, used by the BM-SC to determine a user service description USD and file delivery table FDT instance information of the media.

With reference to the sixth aspect or with reference to any possible implementation manner of the first to third possible implementation manners of the sixth aspect, in a fourth possible implementation manner, the acquiring module is specifically configured to receive the segment content sent by the DASH proxy.

With reference to the sixth aspect or with reference to any possible implementation manner of the first to third possible implementation manners of the sixth aspect, in a fifth possible implementation manner, the multicast request message carries address information of the segment content; and the acquiring module is specifically configured to acquire the segment content from an address that corresponds to the address information of the segment content.

According to a seventh aspect, another apparatus for media stream transmission is provided, including: a sending module, configured to send, to a dynamic adaptive steaming over Hypertext Transfer Protocol DASH proxy, a segment request message used to request segment content of media; and a receiving module, configured to receive a segment multicast instruction message that is sent by the DASH proxy according to the segment request message sent by the sending module, where the segment multicast instruction message carries multicast transmission information of the segment content, and the segment multicast instruction message is used to instruct the DASH client to receive the segment content by using a multimedia broadcast multicast service MBMS client, where the sending module is further configured to send a segment transfer request message to the MBMS client according to the segment multicast instruction message received by the receiving module, where the segment transfer request message carries the multicast transmission information; and the receiving module is further configured to receive the segment content sent by the MBMS client according to the segment transfer request message sent by the sending module.

With reference to the seventh aspect, in a first possible implementation manner, the multicast transmission information carried in the segment multicast instruction message received by the receiving module includes at least one of the following information: information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

According to an eighth aspect, another apparatus for media stream transmission is provided, including: a first receiving module, configured to receive a user service description USD and file delivery table FDT instance information of media that are sent by a broadcast multicast service center BM-SC; a second receiving module, configured to receive segment content of the media according to the USD and the FDT instance information that are received by the first receiving module; a third receiving module, configured to receive a segment transfer request message sent by a dynamic adaptive steaming over Hypertext Transfer Protocol DASH client, where the segment transfer request message carries multicast transmission information of the segment content received by the second receiving module; and a sending module, configured to send, to the DASH client according to the multicast transmission information carried in the segment transfer request message received by the third receiving module, the segment content received by the second receiving module.

With reference to the eighth aspect, in a first possible implementation manner, the multicast transmission information carried in the segment transfer request message received by the third receiving module includes at least one of the following information: information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

According to a ninth aspect, user equipment is provided, including: the first apparatus for media stream transmission in the seventh aspect or the first possible implementation manner of the seventh aspect; and the second apparatus for media stream transmission in the eighth aspect or the first possible implementation manner of the eighth aspect.

Based on the foregoing technical solutions, according to the method and the apparatus for media stream transmission, and user equipment provided in the embodiments of the present invention, same media content, of multiple users, on unicast bearers is multicast by using an MBMS channel, so that a backhaul network (backhaul) resource and an air interface resource that is of a base station can be saved, thereby reducing costs for transmitting a media stream.

BRIEF DESCRIPTION OF DRAWINGS

To describe the technical solutions in the embodiments of the present invention more clearly, the following briefly introduces the accompanying drawings required for describing the embodiments of the present invention or the prior art. Apparently, the accompanying drawings in the following description show merely some embodiments of the present invention, and a person of ordinary skill in the art may still derive other drawings from these accompanying drawings without creative efforts.

FIG. 9 is a schematic block diagram of an apparatus for media stream transmission according to an embodiment of the present invention;

FIG. 10 is a schematic block diagram of an apparatus for media stream transmission according to another embodiment of the present invention;

FIG. 11 is a schematic block diagram of an apparatus for media stream transmission according to still another embodiment of the present invention;

FIG. 12 is a schematic block diagram of an apparatus for media stream transmission according to still another embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (Global System for Mobile communication, "GSM" for short) system, a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short) system, a Long Term Evolution (Long Term Evolution, "LTE" for short) system, an LTE frequency division duplex (Frequency Division Duplex, "FDD" for short) system, an LTE time division duplex (Time Division Duplex, "TDD" for short) system, a Universal Mobile Telecommunications System (Universal Mobile Telecommunication System, "UMTS" for short), a Worldwide Interoperability for Microwave Access (Worldwide Interoperability for Microwave Access, "WiMAX" for short) communications system or the like.

Figure 1:
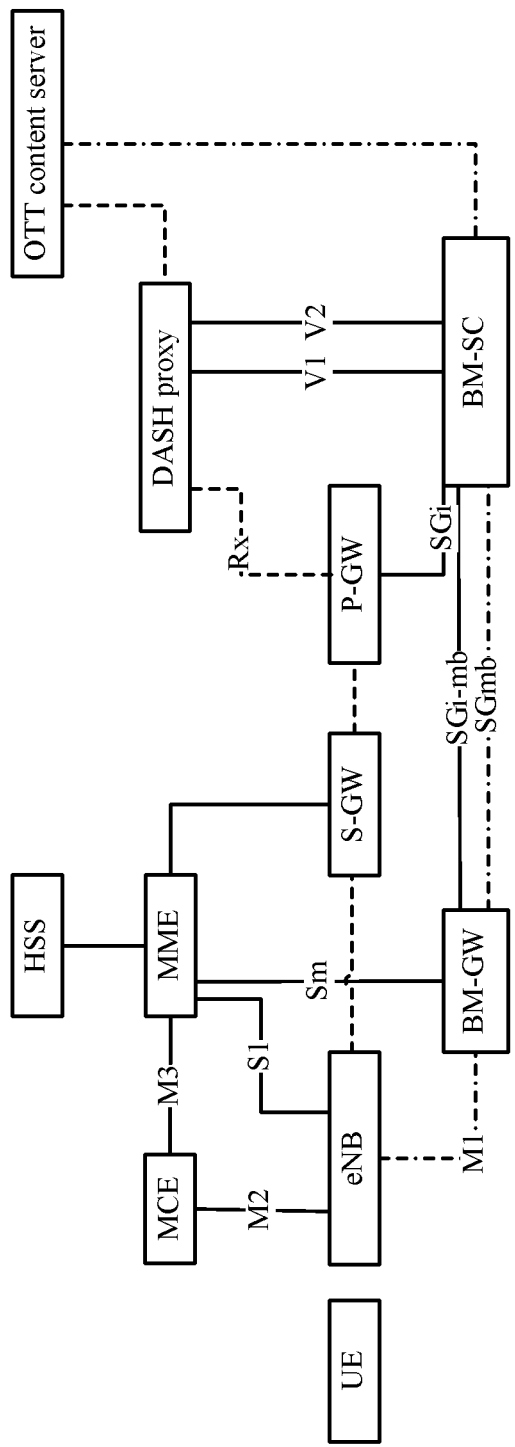
FIG. 1 is a schematic diagram of a network architecture according to an embodiment of the present invention.

FIG. 1 shows a schematic diagram of a network architecture on which an embodiment of the present invention is based. It should be understood that the network architecture shown in FIG. 1 is a specific application architecture in the embodiments of the present invention; however, the embodiments of the present invention may also be based on another network architecture, which is not limited in the embodiments of the present invention.

As shown in FIG. 1, on a transmission path that includes a third-party (Over The Top, "OTT" for short) content server, a DASH proxy, a packet data network gateway (Packet Data Network Gateway, "P-GW" for short), a serving gateway (Serving Gateway, "S-GW" for short), and a base station (eNB) and that is for unicasting a media stream, the DASH proxy may forward a Hypertext Transfer Protocol (Hypertext Transfer Protocol, "HTTP" for short) message that flows through an operator network, and detect a DASH event on the network. In addition, the DASH proxy may further be used as an application function (Application Function, "AF" for short) in a policy and charging control (Policy and charging control, "PCC" for short) architecture, to interact with a policy and charging rules function (Policy and charging rules function, "PCRF" for short) by using an Rx interface.

On a transmission path that includes an OTT content server, a broadcast multicast service center (Broadcast Multicast Service Centre, "BM-SC" for short), a multimedia broadcast multicast service gateway (Multimedia Broadcast Multicast Service Gateway, "BS-GW" for short), and an eNB, and that is for multicasting a media stream, the BM-SC is an entrance for a content provider, and is configured to authorize a user, initiate an MBMS service on a mobile network, and transfer MBMS content according to a predetermined schedule. As a node between the BM-SC and the eNB, the BS-GW is an access gateway of a network, and is responsible for processing a packet related to user data, and signaling related to a session.

In addition, at least one interface (V1 and/or V2) is established between the DASH proxy and the BM-SC. By means of interaction between the DASH proxy and the BM-SC, it can be implemented that DASH data, of multiple users, on unicast bearers is sent by using a channel of the multimedia broadcast multicast (Multimedia Broadcast Multicast Service, "MBMS" for short), to implement unicast and multicast hybrid transmission in a service transmission process.

Figure 2:
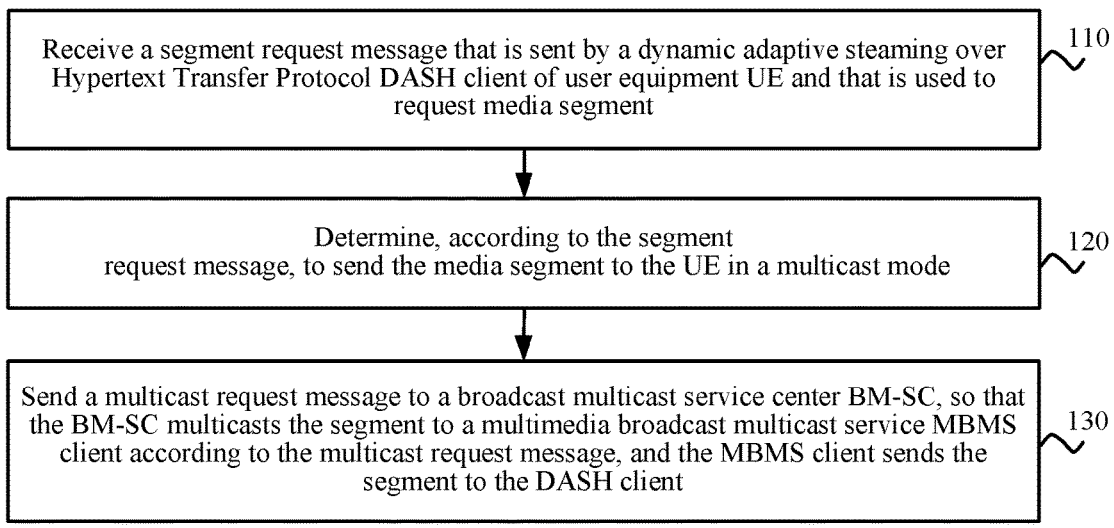
FIG. 2 is a schematic flowchart of a method for media stream transmission according to an embodiment of the present invention.

FIG. 2 shows a schematic flowchart of a method 100 for media stream transmission according to an embodiment of the present invention. The method may be executed by any suitable apparatus, for example, executed by a DASH proxy; however, this embodiment of the present invention is not limited thereto. As shown in FIG. 2, the method 100 includes:

S110. Receive a segment request message that is sent by a dynamic adaptive steaming over Hypertext Transfer Protocol DASH client of user equipment UE and that is used to request segment content of media.

S120. Determine, according to the segment request message, to send the segment content to the UE in a multicast mode.

S130. Send a multicast request message to a broadcast multicast service center BM-SC, so that the BM-SC multicasts the segment content to a multimedia broadcast multicast service MBMS client according to the multicast request message, and the MBMS client sends the segment content to the DASH client.

Therefore, according to the method for media stream transmission in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

Optionally, in S110, the segment request message may carry address information of the segment content, for example, a URL address of the segment content; and the segment request message may be sent to a content server by the DASH client, and when the segment request message flows through the DASH proxy, the DASH proxy detects that the segment request message is a DASH event, and intercepts the segment request message; however, this embodiment of the present invention is not limited thereto.

In S120, the DASH proxy may determine, according to related information of the media, to send the segment content to the UE in a unicast or multicast mode, for example, may determine, according to whether the BM-SC is currently multicasting the segment content of the media, or whether the DASH proxy has received a request that is sent by another user and that requests the segment content of the media, to send the segment content in a unicast or multicast mode; however, this embodiment of the present invention is not limited thereto. Optionally, the determining, according to the segment request message, to send the segment content to the UE in a multicast mode in S120 includes:

S121. When a quantity of received segment request messages used to request segment content of the media exceeds a preset threshold, determine to send the segment content to the UE in a multicast mode.

At least two DASH clients separately send a segment request message to the DASH proxy, and all the segment request messages request segment content of the media. Optionally, the at least two DASH clients may request segment content of a same segment of the media, or may request segment content of different segments of the media. When a quantity of the segment request messages exceeds a preset threshold, and an interval for receiving the segment request message is within a preset range, the DASH proxy may determine to send the segment content in a multicast mode; this embodiment of the present invention is not limited thereto.

Optionally, as another embodiment, the DASH proxy may learn, by interacting with the BM-SC, content that is being multicast by the BM-SC, and when the BM-SC is multicasting the segment content of the media, the DASH proxy or the BM-SC determines to send the segment content to the UE in multicast mode. Optionally, the BM-SC may also be multicasting other segment content of the media, and when an interval between the segment content requested by the segment request message and the segment content that is being multicast by the BM-SC is within a range, the DASH proxy may also determine to send the requested segment content to the UE in a multicast mode; however, this embodiment of the present invention is not limited thereto.

In S130, the DASH proxy sends the multicast request message to the BM-SC, to request the MBMS client to multicast the segment content to the UE, the BM-SC may multicast the segment content to the MBMS client according to the multicast request message by using a MBMS channel, after receiving the segment content, the MBMS client may send the segment content to the DASH client, and the DASH client displays the segment content to the user equipment.

Optionally, the multicast request message carries: identifier information of the segment content, used by the BM-SC to determine the segment content; information about the UE, used by the BM-SC to determine an object to which the segment content is multicast; and a media presentation description MPD of the media, used by the BM-SC to determine a user service description USD and file delivery table FDT instance information of the media.

The DASH client may acquire the MPD of the media in advance, or may acquire the MPD of the media from a content server by interacting with the content server in real time. The BM-SC may generate or update the USD and the FDT instance information of the media according to the MPD of the media, and may further acquire the segment content according to the MPD; however, this embodiment of the present invention is not limited thereto. The identifier information of the segment content may be a segment number of the segment content, and the BM-SC may determine, according to the identifier information of the segment content, the segment content that needs to be multicast. The information about the UE may include IP address information of the UE. When the DASH proxy receives a segment request message that is sent by a DASH client of one UE and that requests the segment content, the multicast request message may carry only the information about the UE; and when the DASH proxy receives segment request messages that are separately sent by DASH clients of at least two UEs and that request segment content of the media, the multicast request message may carry information about the at least two UEs, so that the BM-SC multicasts the segment content to MBMS clients of the UEs according to address information of the UEs; however, this embodiment of the present invention is not limited thereto.

After receiving the multicast request message, the BM-SC may acquire the segment content according to address information of the segment content. Optionally, as another embodiment, the DASH proxy may further send segment content of the media to the BM-SC, where the DASH proxy may acquire the segment content from the content server. Accordingly, the method 100 further includes:

S140. Send the segment content to the BM-SC, so that the BM-SC multicasts the segment content according to the multicast request message.

The DASH proxy may send the segment content after sending the multicast request message, or the segment content is added to the multicast request message; this embodiment of the present invention is not limited thereto.

Figure 3:
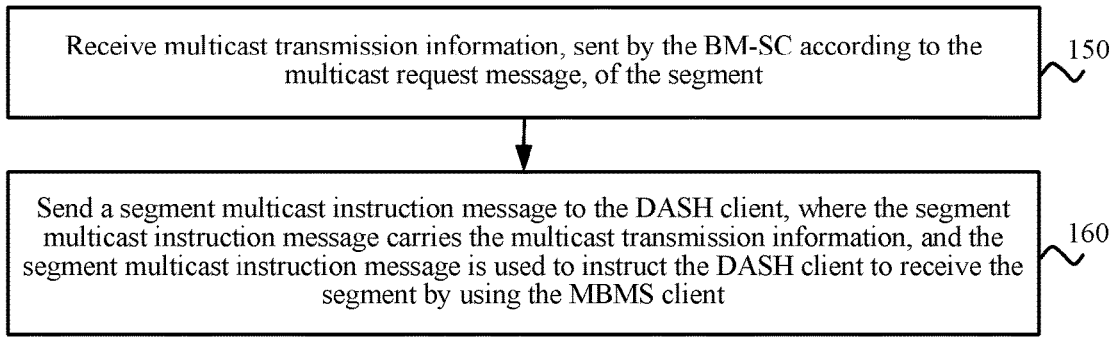
FIG. 3 is another schematic flowchart of a method for media stream transmission according to an embodiment of the present invention.

Optionally, the BM-SC may determine, after receiving the multicast request message, that the request of the DASH proxy can be accepted, and send a multicast request response to the DASH proxy. Optionally, as another embodiment, the BM-SC may further generate multicast transmission information of the segment content, and send the multicast transmission information to the DASH proxy, where the multicast transmission information indicates transmission information when the BM-SC multicasts the segment content. The DASH proxy may send the multicast transmission information of the segment content to the DASH client that sends the segment request message, so that the DASH client may request the segment content from the MBMS client according to the multicast transmission information. Accordingly, as shown in FIG. 3, the method 100 further includes:

S150. Receive multicast transmission information, sent by the BM-SC according to the multicast request message, of the segment content.

S160. Send a segment multicast instruction message to the DASH client, where the segment multicast instruction message carries the multicast transmission information, and the segment multicast instruction message is used to instruct the DASH client to receive the segment content by using the MBMS client.

Optionally, the multicast transmission information includes at least one of the following information: information about a frequency band occupied by multicast of the segment content, a service identifier of the multicast segment content, an MBMS session identifier of the multicast segment content, a transport identifier (Transport Identifier, "TOI" for short) of the multicast segment content, a transport session identifier (Transport Session Identifier, "TSI" for short) of the multicast segment content, a service area in which the segment content is multicast, and scheduling information of the multicast segment content.

Optionally, the multicast transmission information may further include other transmission information, which is not limited in this embodiment of the present invention.

Optionally, when the DASH proxy requests the BM-SC to multicast multiple pieces of segment content, the BM-SC may also establish a one-to-one mapping relationship between multicast transmission information of segment content and a segment identifier of the segment content, so that the DASH client may request segment content from the MBMS client according to the mapping relationship. An optional mapping relationship may be shown in a multicast mapping table shown in Table 1, where the multicast transmission information may include any one of the foregoing information, which is not limited in this embodiment of the present invention.

TABLE 1

Multicast mapping table

| Segment identifier | Multicast transmission information |
|---|---|
| Service A-segment 1 | TSI/MBMS session identifier/service identifier |
| Service A-segment 2 | TSI/MBMS session identifier/service identifier |
| Service B-segment 1 | TSI/MBMS session identifier/service identifier |

Optionally, the DASH client may also request the segment content from the MBMS client by using other information of the segment content instead of the multicast transmission information; this embodiment of the present invention is not limited thereto.

Therefore, according to the method for media stream transmission in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

Figure 4:
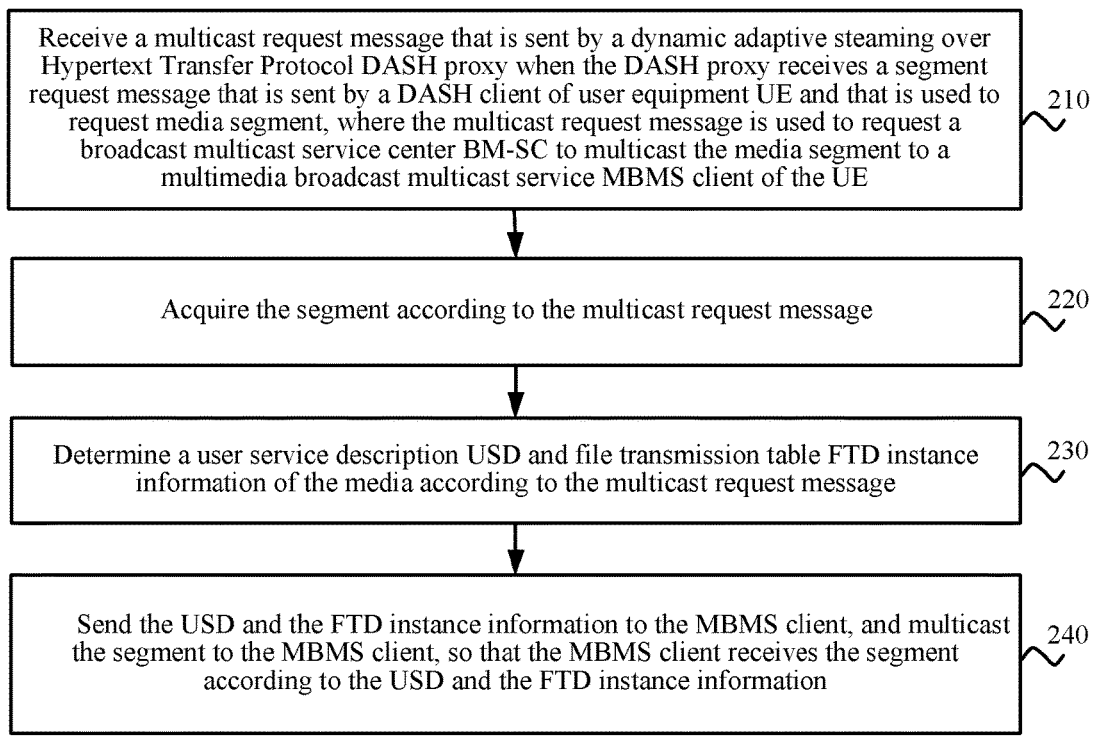
FIG. 4 is a schematic flowchart of a method for media stream transmission according to another embodiment of the present invention.

FIG. 4 shows a schematic flowchart of a method 200 for media stream transmission according to another embodiment of the present invention, where the method may be executed by a BM-SC. As shown in FIG. 4, the method 200 includes:

S210. Receive a multicast request message that is sent by a dynamic adaptive steaming over Hypertext Transfer Protocol DASH proxy when the DASH proxy receives a segment request message that is sent by a DASH client of user equipment UE and that is used to request segment content of media, where the multicast request message is used to request a broadcast multicast service center BM-SC to multicast the segment content of the media to a multimedia broadcast multicast service MBMS client of the UE.

S220. Acquire the segment content according to the multicast request message.

S230. Determine a user service description USD and file delivery table FDT instance information of the media according to the multicast request message.

S240. Send the USD and the FDT instance information to the MBMS client, and multicast the segment content to the MBMS client, so that the MBMS client receives the segment content according to the USD and the FDT instance information.

Therefore, according to the method for media stream transmission in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

S220 and S230 may be simultaneously performed, or may be performed in any sequence, which is not limited in this embodiment of the present invention. In S230, the BM-SC may generate the USD and the FDT instance information of the media, or update the USD and the FDT instance information of the media; this embodiment of the present invention is not limited thereto. Specifically, the BM-SC may acquire the segment content of the media according to a download address, which is included in an MPD, of the segment content, and encode the segment content of the media, to obtain the FDT instance information and the USD information; however, this embodiment of the present invention is not limited thereto.

Optionally, the multicast request message carries: identifier information of the segment content, used by the BM-SC to determine the segment content; information about the UE, used by the BM-SC to determine an object to which the segment content is multicast; and a media presentation description MPD of the media, used by the BM-SC to determine a user service description USD and file delivery table FDT instance information of the media.

The USD information may include at least one of the following information: an MBMS service start time (start time) that may be selected by the UE, a service duration (duration), an MBMS service area identifier list (MBMS SAI list), and information about at least one frequency band in which the MBMS service is played. The MBMS service area identifier list is used to indicate a range within which an MBMS service is broadcast; however, this embodiment of the present invention is not limited thereto.

The BM-SC may acquire the segment content according to address information, carried in the multicast request message, of the segment content, and multicast the segment content to the MBMS client. Optionally, the multicast request message carries the address information of the segment content, and accordingly, the acquiring the segment content according to the multicast request message in S220 includes:

S221. Acquire the segment content from an address that corresponds to the address information of the segment content.

The BM-SC may also acquire subsequent segment content of the current segment content according to the MPD carried in the multicast request message, and multicast the subsequent segment content to the MBMS client, until last segment content of the media is multicast; however, this embodiment of the present invention is not limited thereto.

Optionally, as another embodiment, the BM-SC may also acquire the segment content by receiving the segment content that is sent by the DASH proxy, and accordingly, the acquiring the segment content in S220 includes:

S222. Receive the segment content sent by the DASH proxy.

Figure 5:
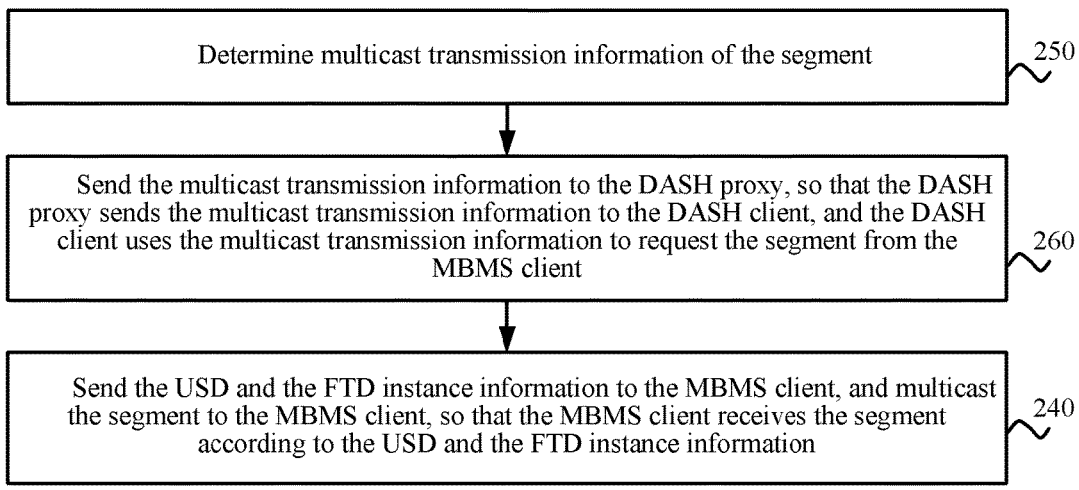
FIG. 5 is another schematic flowchart of a method for media stream transmission according to another embodiment of the present invention.

Optionally, as another embodiment, as shown in FIG. 5, before S240, the method 200 further includes:

S250. Determine multicast transmission information of the segment content.

S260. Send the multicast transmission information to the DASH proxy, so that the DASH proxy sends the multicast transmission information to the DASH client, and the DASH client uses the multicast transmission information to request the segment content from the MBMS client.

In this embodiment of the present invention, a sequence of performing sending, by the BM-SC, the multicast transmission information to the DASH proxy and sending, by the BM-SC, the USD and the FDT instance information (FDT) to the MBMS client is not limited, the BM-SC may multicast the segment content after sending the foregoing information; this embodiment of the present invention is not limited thereto.

Optionally, the multicast transmission information includes at least one of the following information: information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

Therefore, according to the method for media stream transmission in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

Figure 6:
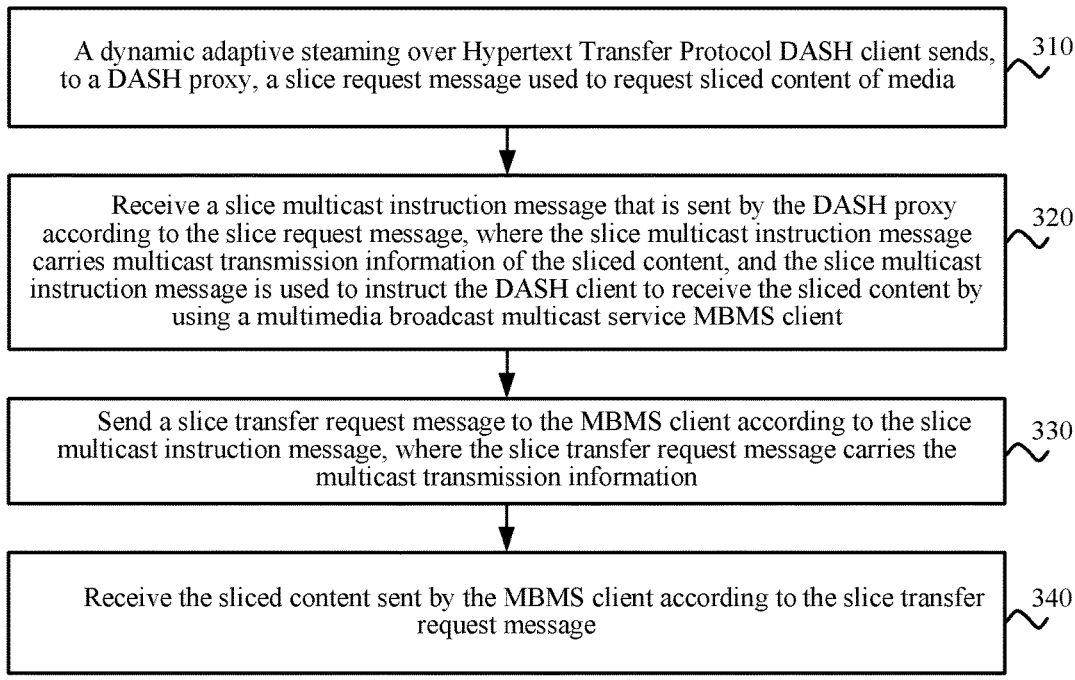
FIG. 6 is a schematic flowchart of a method for media stream transmission according to still another embodiment of the present invention.

FIG. 6 shows a schematic flowchart of a method 300 for media stream transmission according to still another embodiment of the present invention, where the method may be executed by a DASH client. As shown in FIG. 6, the method 300 includes:

S310. A dynamic adaptive steaming over Hypertext Transfer Protocol DASH client sends, to a DASH proxy, a segment request message used to request segment content of media.

S320. Receive a segment multicast instruction message that is sent by the DASH proxy according to the segment request message, where the segment multicast instruction message carries multicast transmission information of the segment content, and the segment multicast instruction message is used to instruct the DASH client to receive the segment content by using a multimedia broadcast multicast service MBMS client.

S330. Send a segment transfer request message to the MBMS client according to the segment multicast instruction message, where the segment transfer request message carries the multicast transmission information.

S340. Receive the segment content sent by the MBMS client according to the segment transfer request message.

Therefore, according to the method for media stream transmission in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

Optionally, the multicast transmission information includes at least one of the following information: information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

Therefore, according to the method for media stream transmission in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

Figure 7:
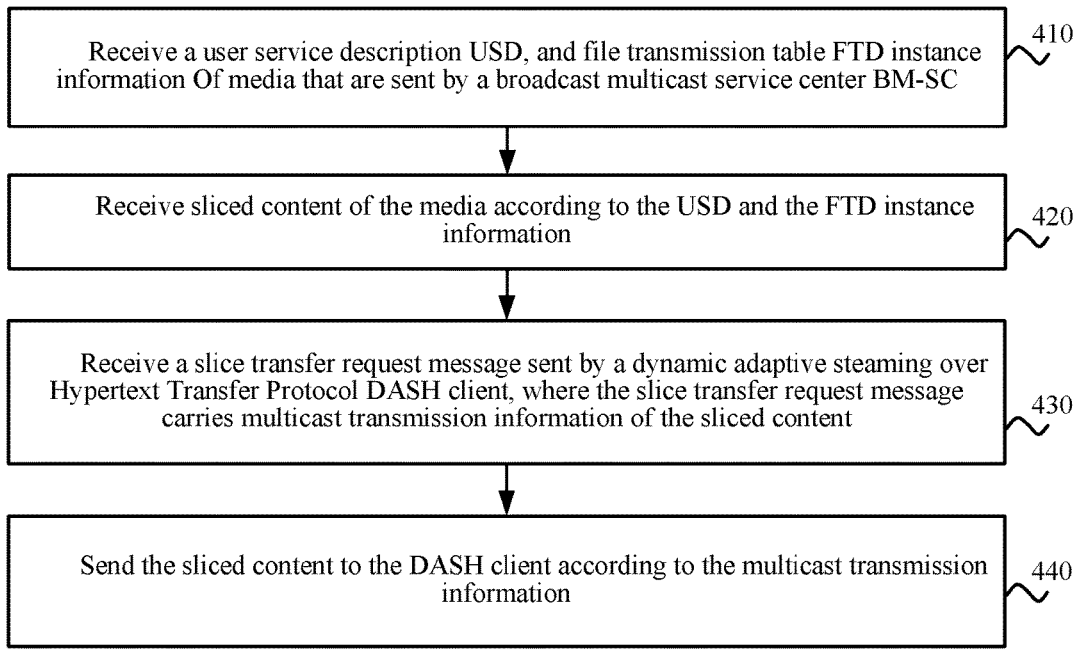
FIG. 7 is a schematic flowchart of a method for media stream transmission according to still another embodiment of the present invention.

FIG. 7 shows a schematic flowchart of a method 400 for media stream transmission according to still another embodiment of the present invention, where the method may be executed by an MBMS client. As shown in FIG. 7, the method 400 includes:

S410. Receive a user service description USD and file delivery table FDT instance information of media that are sent by a broadcast multicast service center BM-SC.

S420. Receive segment content of the media according to the USD and the FDT instance information.

S430. Receive a segment transfer request message sent by a dynamic adaptive steaming over Hypertext Transfer Protocol DASH client, where the segment transfer request message carries multicast transmission information of the segment content.

S440. Send the segment content to the DASH client according to the multicast transmission information.

Therefore, according to the method for media stream transmission in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

Optionally, S420 and S430 may be performed in any sequence, which is not limited in this embodiment of the present invention.

Optionally, the multicast transmission information includes at least one of the following information: information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

Therefore, according to the method for media stream transmission in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

Figure 8:
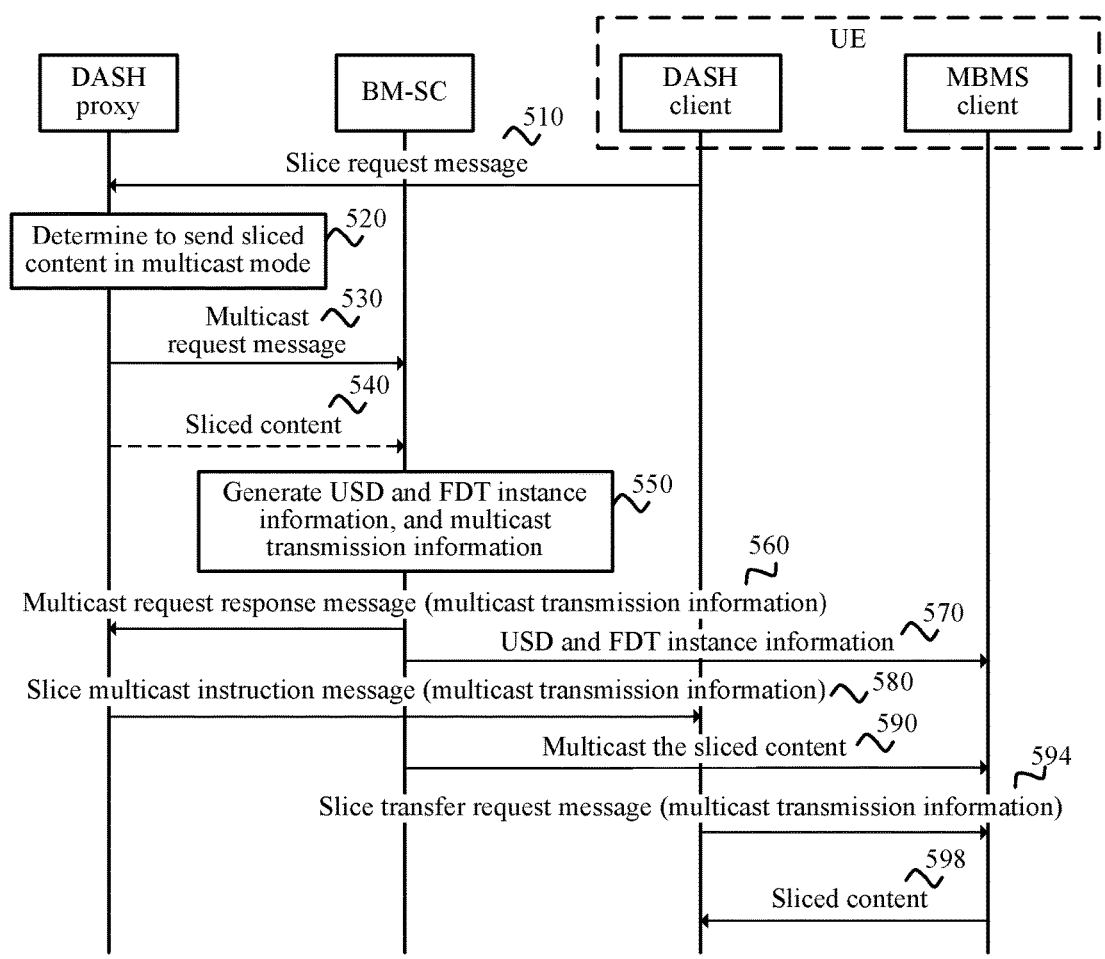
FIG. 8 is a schematic flowchart of a method for media stream transmission according to still another embodiment of the present invention.

With reference to a specific example, the following describes, in a more detailed manner, a method for media stream transmission provided in an embodiment of the present invention. FIG. 8 shows a schematic flowchart of a method 500 for media stream transmission according to still another embodiment of the present invention. As shown in FIG. 8, the method 500 includes:

S510. A DASH client of UE sends, according to MPD information of media, a segment request message that is used to request segment content of the media.

The segment request message may be an "HTTP Get" message, and the message carries a URL address of a segment that corresponds to the segment content; however, this embodiment of the present invention is not limited thereto. The DASH client may send the segment request message to an OTT content server, and the message is intercepted by a DASH proxy when flowing through the DASH proxy; or a destination address to which the DASH client sends the segment request message is the DASH proxy; this embodiment of the present invention is not limited thereto.

S520. A DASH proxy determines to send the segment content in a multicast mode.

The DASH proxy may perform query by using user agent profile (User Agent Profile, "UAProf" for short) information carried in the segment request message, and determine whether the UE supports an MBMS service; and when the UE supports the MBMS service, the DASH proxy may determine to send the segment content in a unicast or multicast mode; or when the UE does not support the MBMS service or the DASH proxy determines to send the segment content in a unicast mode, the DASH proxy may send the segment content to the UE by using a method in the prior art, which is not limited in this embodiment of the present invention. When the DASH proxy determines that the segment content may be sent in a multicast mode, the DASH proxy performs S530.

S530. The DASH proxy sends a multicast request message to a BM-SC to request the BM-SC to multicast the segment content to an MBMS client of the UE.

The multicast request message carries an MPD of the media, address information of the segment content, and IP address information of the UE; however, this embodiment of the present invention is not limited thereto. Optionally, the DASH proxy may further perform S540, and accordingly, the BM-SC may receive the segment content sent by the DASH proxy, and multicast the segment content.

S540. The DASH proxy sends the segment content to the BM-SC.

S550. The BM-SC constructs or updates USD information and FDT instance information of the media, and generates multicast transmission information of the segment content.

The BM-SC may construct or update the USD information by using the method in the prior art, which is not limited in this embodiment of the present invention.

S560. The BM-SC sends a multicast request response message to the DASH proxy, where the multicast request response message carries the multicast transmission information.

The multicast request response message is used to indicate that the BM-SC accepts the request of the DASH proxy to multicast the segment content. The multicast transmission information may be used by the DASH client to request the segment content from the MBMS client, and the multicast transmission information may include any information that can distinguish the segment content from other segment content received by the MBMS client, which is not limited in this embodiment of the present invention. Optionally, the multicast request response message may further carry other information; this embodiment of the present invention is not limited thereto.

S570. The BM-SC sends the USD information and the FDT instance information to the MBMS client of the UE.

The MBMS client may receive the segment content according to the received USD information and FDT instance information. In addition, S560 and S570 may be performed simultaneously or may be separately performed in any sequence, and a sequence of performing the two steps is not limited in this embodiment of the present invention.

S580. The DASH proxy sends a segment multicast instruction message to the DASH client according to the multicast request response message sent by the BM-SC, where the segment multicast instruction message instructs the DASH client to receive the segment content by using the MBMS client of the UE, and the segment multicast instruction message carries the multicast transmission information.

S590. The BM-SC multicasts the segment content to the MBMS client of the UE by using an MBMS transmission channel.

The BM-SC may perform encoding processing (for example, File Delivery over Unidirectional Transport, FLUTE, encoding) on the segment content and multicast the segment content, and accordingly, after receiving a transmitted file according to the USD and the FDT instance information, the MBMS client may perform decoding processing (for example, flute decoding) on the transmitted file; however, this embodiment of the present invention is not limited thereto.

S594. The DASH client sends a segment transfer request message to the MBMS client according to the segment multicast instruction message, to request the MBMS client to send the segment content that corresponds to the multicast transmission information to the DASH client.

S598. The MBMS client sends the segment content to the DASH client according to the segment transfer request message.

After receiving the segment content, the DASH client may perform decoding processing on the segment content, and display the decoded content to the UE; this embodiment of the present invention is not limited thereto.

Therefore, according to the method for media stream transmission in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

It should be noticed that the example in FIG. 8 is for the purpose of helping a person skilled in the art better understand the embodiments of the present invention, and does not intend to limit the scope of the embodiments of the present invention. A person skilled in the art obviously may make various equivalent modifications or changes according to the example provided in FIG. 8, and the modifications or changes also fall within the scope of the embodiments of the present invention.

It should be understood that numbers of the foregoing processes do not mean execution sequences. The execution sequences of the processes should be determined according to functions and internal logic of the processes, and should not be construed as any limitation on the implementation processes of the embodiments of the present invention.

The methods for media stream transmission according to the embodiments of the present invention are described in detail above with reference to FIG. 1 to FIG. 8, and apparatuses for media stream transmission according to embodiments of the present invention are described below with reference to FIG. 9 to FIG. 16.

FIG. 9 shows a schematic block diagram of an apparatus 600 for media stream transmission according to an embodiment of the present invention. The apparatus 600 for media stream transmission may be a DASH proxy; however, this embodiment of the present invention is not limited thereto. As shown in FIG. 9, the apparatus 600 for media stream transmission includes:

a receiving module 610, configured to receive a segment request message that is sent by a dynamic adaptive steaming over Hypertext Transfer Protocol DASH client of user equipment UE and that is used to request segment content of media;

a determining module 620, configured to determine, according to the segment request message received by the receiving module 610, to send the segment content to the UE in a multicast mode; and a sending module 630, configured to send a multicast request message to a broadcast multicast service center BM-SC, so that the BM-SC multicasts the segment content to a multimedia broadcast multicast service MBMS client according to the multicast request message, and the MBMS client sends the segment content to the DASH client.

Therefore, according to the apparatus for media stream transmission in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

Optionally, the receiving module 610 is further configured to receive multicast transmission information, sent by the BM-SC according to the multicast request message, of the segment content; and the sending module 630 is further configured to send a segment multicast instruction message to the DASH client, where the segment multicast instruction message carries the multicast transmission information received by the receiving module 610, and the segment multicast instruction message is used to instruct the DASH client to receive the segment content by using the MBMS client.

Optionally, the multicast transmission information received by the receiving module 610 includes at least one of the following information: information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

Optionally, as another embodiment, the determining module 620 is specifically configured to: when a quantity of segment request messages that are received by the receiving module 610 and that are used to request segment content of the media exceeds a preset threshold, determine to send the segment content to the UE in a multicast mode.

Optionally, as another embodiment, the multicast request message sent by the sending module 630 carries: identifier information of the segment content, used by the BM-SC to determine the segment content; information about the UE, used by the BM-SC to determine an object to which the segment content is multicast; and a media presentation description MPD of the media, used by the BM-SC to determine a user service description USD and file delivery table FDT instance information of the media.

Optionally, as another embodiment, the sending module 630 is further configured to send the segment content to the BM-SC, so that the BM-SC multicasts the segment content according to the multicast request message.

The apparatus 600 for media stream transmission according to this embodiment of the present invention may correspond to the DASH proxy in the methods for media stream transmission according to the embodiments of the present invention. In addition, the foregoing and other operations and/or functions of the modules in the apparatus 600 for media stream transmission are separately for implementing corresponding procedures of the methods in FIG. 1 to FIG. 3, and FIG. 8. For the purpose of conciseness, details are not described herein again.

Therefore, according to the apparatus for media stream transmission in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

FIG. 10 shows a schematic block diagram of an apparatus 700 for media stream transmission according to another embodiment of the present invention. The apparatus 700 for media stream transmission may be a BM-SC; however, this embodiment of the present invention is not limited thereto. As shown in FIG. 10, the apparatus 700 for media stream transmission includes:

a receiving module 710, configured to receive a multicast request message that is sent by a dynamic adaptive steaming over Hypertext Transfer Protocol DASH proxy when the DASH proxy receives a segment request message that is sent by a DASH client of user equipment UE and that is used to request segment content of media, where the multicast request message is used to request a broadcast multicast service center BM-SC to multicast the segment content of the media to a multimedia broadcast multicast service MBMS client of the UE;

an acquiring module 720, configured to acquire the segment content according to the multicast request message received by the receiving module 710;

a determining module 730, configured to determine a user service description USD and file delivery table FDT instance information of the media according to the multicast request message received by the receiving module 710; and a sending module 740, configured to send the USD and the FDT instance information that are determined by the determining module 730 to the MBMS client, and multicast, to the MBMS client, the segment content acquired by the acquiring module 720, so that the MBMS client receives the segment content according to the USD and the FDT instance information.

Therefore, according to the apparatus for media stream transmission in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

Optionally, the determining module 730 is further configured to: before the sending module 740 multicasts the segment content to the MBMS client, determine multicast transmission information of the segment content; and the sending module 740 is further configured to send the multicast transmission information determined by the determining module 730 to the DASH proxy, so that the DASH proxy sends the multicast transmission information to the DASH client, and the DASH client uses the multicast transmission information to request the segment content from the MBMS client.

Optionally, as another embodiment, the multicast transmission information determined by the determining module 730 includes at least one of the following information: a segment identifier of the segment content, information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

Optionally, as another embodiment, the multicast request message received by the receiving module 710 carries: identifier information of the segment content, used by the BM-SC to determine the segment content; information about the UE, used by the BM-SC to determine an object to which the segment content is multicast; and a media presentation description MPD of the media, used by the BM-SC to determine a user service description USD and file delivery table FDT instance information of the media.

Optionally, as another embodiment, the acquiring module 720 is specifically configured to receive the segment content sent by the DASH proxy.

Optionally, as another embodiment, the multicast request message received by the receiving module 710 carries address information of the segment content; and accordingly, the acquiring module 720 is specifically configured to acquire the segment content from an address that corresponds to the address information of the segment content. The apparatus 700 for media stream transmission according to this embodiment of the present invention may correspond to the BM-SC in the methods for media stream transmission according to the embodiments of the present invention. In addition, the foregoing and other operations and/or functions of the modules in the apparatus 700 for media stream transmission are separately for implementing corresponding procedures of the methods in FIG. 4, FIG. 5, and FIG. 8. For the purpose of conciseness, details are not described herein again.

Therefore, according to the apparatus for media stream transmission in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

FIG. 11 shows a schematic block diagram of an apparatus 800 for media stream transmission according to still another embodiment of the present invention. The apparatus 800 for media stream transmission may be a DASH client; however, this embodiment of the present invention is not limited thereto. As shown in FIG. 11, the apparatus 800 for media stream transmission includes:

a sending module 810, configured to send, to a dynamic adaptive steaming over Hypertext Transfer Protocol DASH proxy, a segment request message used to request segment content of media; and a receiving module 820, configured to receive a segment multicast instruction message that is sent by the DASH proxy according to the segment request message sent by the sending module 810, where the segment multicast instruction message carries multicast transmission information of the segment content, and the segment multicast instruction message is used to instruct the DASH client to receive the segment content by using a multimedia broadcast multicast service MBMS client, where the sending module 810 is further configured to send a segment transfer request message to the MBMS client according to the segment multicast instruction message received by the receiving module 820, where the segment transfer request message carries the multicast transmission information; and the receiving module 820 is further configured to receive the segment content sent by the MBMS client according to the segment transfer request message sent by the sending module 810.

Optionally, the multicast transmission information carried in the segment multicast instruction message received by the receiving module 820 includes at least one of the following information: information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

The apparatus 800 for media stream transmission according to this embodiment of the present invention may correspond to the DASH client in the methods for media stream transmission according to the embodiments of the present invention. In addition, the foregoing and other operations and/or functions of the modules in the apparatus 800 for media stream transmission are separately for implementing corresponding procedures of the methods in FIG. 6 and FIG. 8. For the purpose of conciseness, details are not described herein again.

Therefore, according to the apparatus for media stream transmission in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

FIG. 12 shows a schematic block diagram of an apparatus 900 for media stream transmission according to still another embodiment of the present invention. The apparatus 900 for media stream transmission may be an MBMS client; however, this embodiment of the present invention is not limited thereto. As shown in FIG. 12, the apparatus 900 for media stream transmission includes:

a first receiving module 910, configured to receive a user service description USD and file delivery table FDT instance information of media that are sent by a broadcast multicast service center BM-SC;

a second receiving module 920, configured to receive segment content of the media according to the USD and the FDT instance information that are received by the first receiving module 910;

a third receiving module 930, configured to receive a segment transfer request message sent by a dynamic adaptive steaming over Hypertext Transfer Protocol DASH client, where the segment transfer request message carries multicast transmission information of the segment content received by the second receiving module 920; and a sending module 940, configured to send, to the DASH client according to the multicast transmission information carried in the segment transfer request message received by the third receiving module 930, the segment content received by the second receiving module 920.

Optionally, the multicast transmission information carried in the segment transfer request message received by the third receiving module 930 includes at least one of the following information: information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

The apparatus 900 for media stream transmission according to this embodiment of the present invention may correspond to the MBMS client in the methods for media stream transmission according to the embodiments of the present invention. In addition, the foregoing and other operations and/or functions of the modules in the apparatus 900 for media stream transmission are separately for implementing corresponding procedures of the methods in FIG. 7 and FIG. 8. For the purpose of conciseness, details are not described herein again.

Therefore, according to the apparatus for media stream transmission in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

Figure 13:
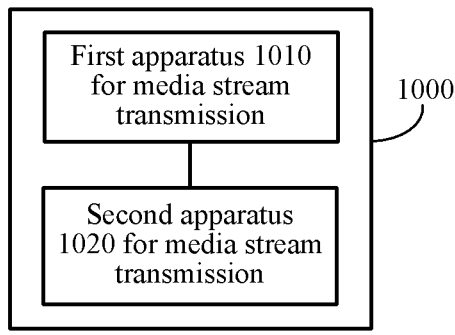
FIG. 13 is a schematic block diagram of user equipment according to an embodiment of the present invention.

FIG. 13 shows a schematic block diagram of user equipment 1000 according to an embodiment of the present invention. The user equipment 1000 includes: the first apparatus 1010 for media stream transmission shown in FIG. 11 and the second apparatus 1020 for media stream transmission shown in FIG. 12.

The first apparatus may be a DASH client, and the second apparatus may be an MBMS client; however, this embodiment of the present invention is not limited thereto.

Therefore, according to the user equipment in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

Figure 14:
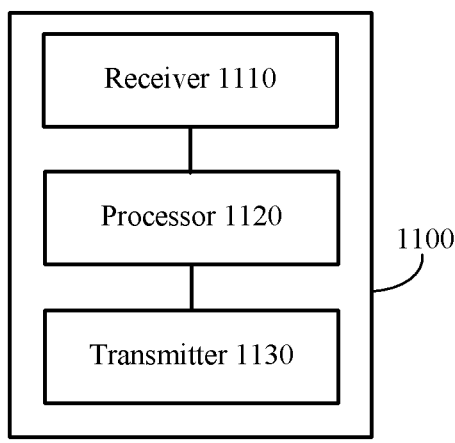
FIG. 14 is a schematic block diagram of an apparatus for media stream transmission according to still another embodiment of the present invention.

FIG. 14 shows a schematic block diagram of an apparatus 1100 for media stream transmission according to still another embodiment of the present invention. The apparatus 1100 for media stream transmission may be a DASH proxy; however, this embodiment of the present invention is not limited thereto. As shown in FIG. 14, the apparatus 1100 for media stream transmission includes:

a receiver 1110, configured to receive a segment request message that is sent by a dynamic adaptive steaming over Hypertext Transfer Protocol DASH client of user equipment UE and that is used to request segment content of media;

a processor 1120, configured to determine, according to the segment request message received by the receiver 1110, to send the segment content to the UE in a multicast mode; and a transmitter 1130, configured to send a multicast request message to a broadcast multicast service center BM-SC, so that the BM-SC multicasts the segment content to a multimedia broadcast multicast service MBMS client according to the multicast request message, and the MBMS client sends the segment content to the DASH client.

Therefore, according to the apparatus for media stream transmission in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

It should be understood that in the embodiments of the present invention, the processor 1110 may be a central processing unit (Central Processing Unit, "CPU" for short), or the processor 1110 may be another general purpose processor, a digital signal processor (DSP), an application-specific integrated circuit (ASIC), a field programmable gate array (FPGA), or another programmable logical device, discrete gate or transistor logical device, discrete hardware component, or the like. A general purpose processor may be a microprocessor or the processor may be any conventional processor and the like.

In an implementation process, the foregoing steps may be implemented by a hardware integrated logical circuit in the processor 1110, or an instruction in a form of software. Steps of the methods disclosed with reference to the embodiments of the present invention may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor 1110 reads information in the memory and completes the steps in the foregoing methods in combination with hardware of the processor. To avoid repetition, details are not described herein again. The receiver 1110 is further configured to receive multicast transmission information, sent by the BM-SC according to the multicast request message, of the segment content; and the transmitter 1130 is further configured to send a segment multicast instruction message to the DASH client, where the segment multicast instruction message carries the multicast transmission information received by the receiver 1110, and the segment multicast instruction message is used to instruct the DASH client to receive the segment content by using the MBMS client.

Optionally, the multicast transmission information received by the receiver 1110 includes at least one of the following information: information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

Optionally, as another embodiment, the processor 1120 is specifically configured to: when a quantity of segment request messages that are received by the receiver 1110 and that are used to request segment content of the media exceeds a preset threshold, determine to send the segment content to the UE in a multicast mode.

Optionally, as another embodiment, the multicast request message sent by the transmitter 1130 carries: identifier information of the segment content, used by the BM-SC to determine the segment content; information about the UE, used by the BM-SC to determine an object to which the segment content is multicast; and a media presentation description MPD of the media, used by the BM-SC to determine a user service description USD and file delivery table FDT instance information of the media.

Optionally, as another embodiment, the transmitter 1130 is further configured to send the segment content to the BM-SC, so that the BM-SC multicasts the segment content according to the multicast request message.

The apparatus 1100 for media stream transmission according to this embodiment of the present invention may correspond to the DASH proxy in the methods for media stream transmission according to the embodiments of the present invention. In addition, the foregoing and other operations and/or functions of the modules in the apparatus 1100 for media stream transmission are separately for implementing corresponding procedures of the methods in FIG. 1 to FIG. 3, and FIG. 8. For the purpose of conciseness, details are not described herein again.

Therefore, according to the apparatus for media stream transmission in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

Figure 15:
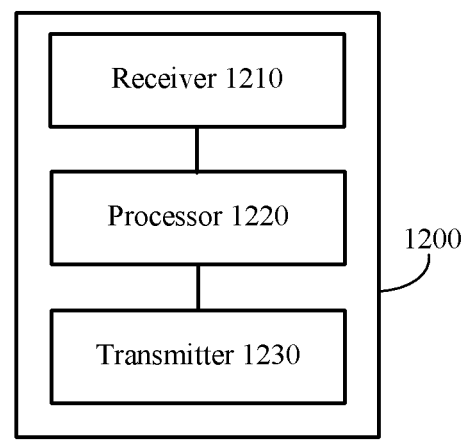
FIG. 15 is a schematic block diagram of an apparatus for media stream transmission according to still another embodiment of the present invention.

FIG. 15 shows a schematic block diagram of an apparatus 1200 for media stream transmission according to still another embodiment of the present invention. The apparatus 1200 for media stream transmission may be a BM-SC; however, this embodiment of the present invention is not limited thereto. As shown in FIG. 15, the apparatus 1200 for media stream transmission includes:

a receiver 1210, configured to receive a multicast request message that is sent by a dynamic adaptive steaming over Hypertext Transfer Protocol DASH proxy when the DASH proxy receives a segment request message that is sent by a DASH client of user equipment UE and that is used to request segment content of media, where the multicast request message is used to request a broadcast multicast service center BM-SC to multicast the segment content of the media to a multimedia broadcast multicast service MBMS client of the UE;

a processor 1220, configured to acquire the segment content, and determine a user service description USD and file delivery table FDT instance information of the media according to the multicast request message received by the receiver 1210; and a transmitter 1230, configured to send the USD and the FDT instance information that are determined by the processor 1220 to the MBMS client, and multicast the segment content to the MBMS client, so that the MBMS client receives the segment content according to the USD and the FDT instance information.

Therefore, according to the apparatus for media stream transmission in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

It should be understood that in the embodiments of the present invention, the processor 1220 may be a central processing unit (Central Processing Unit, "CPU" for short), or the processor 1220 may be another general purpose processor, a digital signal processor (DSP), an application-specific integrated circuit (ASIC), a field programmable gate array (FPGA), or another programmable logical device, discrete gate or transistor logical device, discrete hardware component, or the like. A general purpose processor may be a microprocessor or the processor may be any conventional processor and the like.

In an implementation process, the foregoing steps may be implemented by a hardware integrated logical circuit in the processor 1220, or an instruction in a form of software. Steps of the methods disclosed with reference to the embodiments of the present invention may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor 1220 reads information in the memory and completes the steps in the foregoing methods in combination with hardware of the processor. To avoid repetition, details are not described herein again.

Optionally, the processor 1220 is further configured to: before the transmitter 1230 multicasts the segment content to the MBMS client, determine multicast transmission information of the segment content; and the transmitter 1230 is further configured to send the multicast transmission information determined by the processor 1220 to the DASH proxy, so that the DASH proxy sends the multicast transmission information to the DASH client, and the DASH client uses the multicast transmission information to request the segment content from the MBMS client.

Optionally, as another embodiment, the multicast transmission information determined by the processor 1220 includes at least one of the following information: information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

Optionally, as another embodiment, the multicast request message received by the receiver 1210 carries: identifier information of the segment content, used by the BM-SC to determine the segment content; information about the UE, used by the BM-SC to determine an object to which the segment content is multicast; and a media presentation description MPD of the media, used by the BM-SC to determine a user service description USD and file delivery table FDT instance information of the media.

Optionally, as another embodiment, the processor 1220 is specifically configured to acquire the segment content by receiving the segment content sent by the DASH proxy.

Optionally, as another embodiment, the multicast request message received by the receiver 1210 carries address information of the segment content; and accordingly, the processor 1220 is specifically configured to acquire the segment content from an address that corresponds to the address information of the segment content.

The apparatus 1200 for media stream transmission according to this embodiment of the present invention may correspond to the BM-SC in the methods for media stream transmission according to the embodiments of the present invention. In addition, the foregoing and other operations and/or functions of the modules in the apparatus 1200 for media stream transmission are separately for implementing corresponding procedures of the methods in FIG. 4, FIG. 5, and FIG. 8. For the purpose of conciseness, details are not described herein again.

Therefore, according to the apparatus for media stream transmission in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

Figure 16:
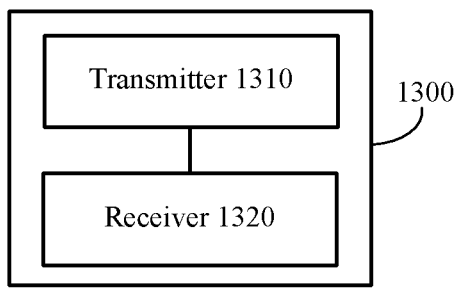
FIG. 16 is a schematic block diagram of an apparatus for media stream transmission according to still another embodiment of the present invention.

FIG. 16 shows a schematic block diagram of an apparatus 1300 for media stream transmission according to still another embodiment of the present invention. The apparatus 1300 for media stream transmission may be a DASH client; however, this embodiment of the present invention is not limited thereto. As shown in FIG. 16, the apparatus 1300 for media stream transmission includes:

a transmitter 1310, configured to send, to a dynamic adaptive steaming over Hypertext Transfer Protocol DASH proxy, a segment request message used to request segment content of media; and a receiver 1320, configured to receive a segment multicast instruction message that is sent by the DASH proxy according to the segment request message sent by the transmitter 1310, where the segment multicast instruction message carries multicast transmission information of the segment content, and the segment multicast instruction message is used to instruct the DASH client to receive the segment content by using a multimedia broadcast multicast service MBMS client, where the transmitter 1310 is further configured to send a segment transfer request message to the MBMS client according to the segment multicast instruction message received by the receiver 1320, where the segment transfer request message carries the multicast transmission information; and the receiver 1320 is further configured to receive the segment content sent by the MBMS client according to the segment transfer request message sent by the transmitter 1310. Optionally, the multicast transmission information carried in the segment multicast instruction message received by the receiver 1320 includes at least one of the following information: information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

The apparatus 1300 for media stream transmission according to this embodiment of the present invention may correspond to the DASH client in the methods for media stream transmission according to the embodiments of the present invention. In addition, the foregoing and other operations and/or functions of the modules in the apparatus 1300 for media stream transmission are separately for implementing corresponding procedures of the methods in FIG. 6 and FIG. 8. For the purpose of conciseness, details are not described herein again.

Therefore, according to the apparatus for media stream transmission in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

Figure 17:
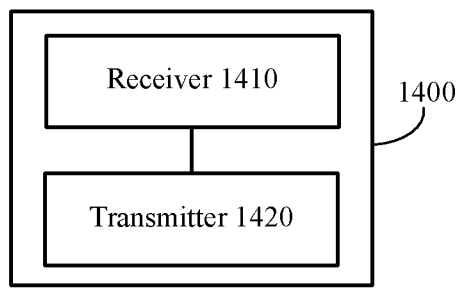
FIG. 17 is a schematic block diagram of an apparatus for media stream transmission according to still another embodiment of the present invention.

FIG. 17 shows a schematic block diagram of an apparatus 1400 for media stream transmission according to still another embodiment of the present invention. The apparatus 1400 for media stream transmission may be an MBMS client; however, this embodiment of the present invention is not limited thereto. As shown in FIG. 17, the apparatus 1400 for media stream transmission includes:

a receiver 1410, configured to receive a user service description USD and file delivery table FDT instance information of media that are sent by a broadcast multicast service center BM-SC; receive segment content of the media according to the USD and the FDT instance information; and receive a segment transfer request message sent by a dynamic adaptive steaming over Hypertext Transfer Protocol DASH client, where the segment transfer request message carries multicast transmission information of the segment content; and a transmitter 1420, configured to send, to the DASH client according to the multicast transmission information carried in the segment transfer request message received by the receiver 1410, the segment content received by the receiver 1410.

Optionally, the multicast transmission information carried in the segment transfer request message received by the receiver 1410 includes at least one of the following information: information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

The apparatus 1400 for media stream transmission according to this embodiment of the present invention may correspond to the MBMS client in the methods for media stream transmission according to the embodiments of the present invention. In addition, the foregoing and other operations and/or functions of the modules in the apparatus 1400 for media stream transmission are separately for implementing corresponding procedures of the methods in FIG. 7 and FIG. 8. For the purpose of conciseness, details are not described herein again.

Therefore, according to the apparatus for media stream transmission in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

Figure 18:
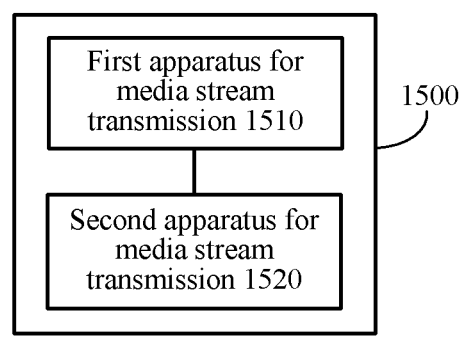
FIG. 18 is a schematic block diagram of user equipment according to another embodiment of the present invention.

FIG. 18 shows a schematic block diagram of user equipment 1500 according to an embodiment of the present invention. The user equipment 1500 includes: the first apparatus 1510 for media stream transmission shown in FIG. 16 and the second apparatus 1520 for media stream transmission shown in FIG. 17.

The first apparatus may be a DASH client, and the second apparatus may be an MBMS client; however, this embodiment of the present invention is not limited thereto.

Therefore, according to the user equipment in this embodiment of the present invention, same media content, of multiple users, on unicast bearers is multicast by using an MBMS channel, so that a backhaul network resource and an air interface resource that is of a base station can be saved, thereby reducing costs for transmitting a media stream.

It should be understood that, the term "and/or" in this embodiment of the present invention describes only an association relationship for describing associated objects and represents that three relationships may exist. For example, A and/or B may represent the following three cases: Only A exists, both A and B exist, and only B exists. In addition, the character "/" in this specification generally indicates an or relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for media stream transmission, comprising:
    receiving a segment request message that is sent by a dynamic adaptive steaming over Hypertext Transfer Protocol (DASH) client of user equipment (UE) and that is used to request segment content of media;
    determining, according to the segment request message, to send the segment content to the UE in a multicast mode; and
    sending a multicast request message to a broadcast multicast service center (BM-SC), so that the BM-SC multicasts the segment content to a multimedia broadcast multicast service (MBMS) client according to the multicast request message, and the MBMS client sends the segment content to the DASH client, wherein the multicast request message carries IP address information of the UE, used by the BM-SC to determine an object to which the segment content is multicast, identifier information of the segment content, used by the BM-SC to determine the segment content, and a media presentation description MPD of the media, used by the BM-SC to determine a user service description USD and file delivery table (FDT) instance information of the media.

2. The method according to claim 1, wherein the method further comprises:
    receiving multicast transmission information, sent by the BM-SC according to the multicast request message, of the segment content; and
    sending a segment multicast instruction message to the DASH client, wherein the segment multicast instruction message carries the multicast transmission information, and the segment multicast instruction message is used to instruct the DASH client to receive the segment content by using the MBMS client.

3. The method according to claim 2, wherein the multicast transmission information comprises at least one of the following information: information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

4. The method according to claim 1, wherein the determining, according to the segment request message, to send the segment content to the UE in a multicast mode comprises:
    when a quantity of received segment request messages used to request segment content of the media exceeds a preset threshold, determining to send the segment content to the UE in a multicast mode.

5. A method for media stream transmission, comprising:
    receiving a multicast request message that is sent by a dynamic adaptive steaming over Hypertext Transfer Protocol (DASH) proxy when the DASH proxy receives a segment request message that is sent by a DASH client of user equipment UE and that is used to request segment content of media, wherein the multicast request message is used to request a broadcast multicast service center (BM-SC) to multicast the segment content of the media to a multimedia broadcast multicast service (MBMS) client of the UE, wherein the multicast request message carries IP address information of the UE, used by the BM-SC to determine an object to which the segment content is multicast, identifier information of the segment content, used by the BM-SC to determine the segment content, and a media presentation description MPD of the media, used by the BM-SC to determine a user service description USD and file delivery table (FDT) instance information of the media;
    acquiring the segment content according to the multicast request message;
    determining a user service description USD and file delivery table FDT instance information of the media according to the multicast request message; and
    sending the USD and the FDT instance information to the MBMS client, and multicasting the segment content to the MBMS client, so that the MBMS client receives the segment content according to the USD and the FDT instance information.

6. The method according to claim 5, wherein before the multicasting the segment content to the MBMS client, the method further comprises:
determining multicast transmission information of the segment content; and
sending the multicast transmission information to the DASH proxy, so that the DASH proxy sends the multicast transmission information to the DASH client, and the DASH client uses the multicast transmission information to request the segment content from the MBMS client.

7. The method according to claim 6, wherein the multicast transmission information comprises at least one of the following information: information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

8. A method for media stream transmission, comprising:
sending, by a dynamic adaptive steaming over Hypertext Transfer Protocol (DASH) client, to a DASH proxy, a segment request message used to request segment content of media;
receiving a segment multicast instruction message that is sent by the DASH proxy according to the segment request message, wherein the segment multicast instruction message carries multicast transmission information of the segment content, and the segment multicast instruction message is used to instruct the DASH client to receive the segment content by using a multimedia broadcast multicast service (MBMS) client;
sending a segment transfer request message to the MBMS client according to the segment multicast instruction message, wherein the segment transfer request message carries the multicast transmission information; and
receiving the segment content sent by the MBMS client according to the segment transfer request message,
wherein the segment multicast instruction message carries IP address information of a user equipment (UE) to determine an object to which the segment content is multicast, identifier information of the segment content to determine the segment content, and a media presentation description MPD of the media to determine a user service description USD and file delivery table (FDT) instance information of the media.

9. A method for media stream transmission, comprising:
receiving a user service description (USD) and file delivery table (FDT) instance information of media that are sent by a broadcast multicast service center BM-SC;
receiving segment content of the media according to the USD and the FDT instance information;
receiving a segment transfer request message sent by a dynamic adaptive steaming over Hypertext Transfer Protocol DASH client, wherein the segment transfer request message carries multicast transmission information of the segment content that includes IP address information of user equipment (UE), used by the BM-SC to determine an object to which the segment content is multicast, identifier information of the segment content, used by the BM-SC to determine the segment content, and a media presentation description MPD of the media, used by the BM-SC to determine the USD and the FDT instance information of the media; and
sending the segment content to the DASH client according to the multicast transmission information.

10. An apparatus for media stream transmission, comprising:
a receiver, configured to receive a segment request message that is sent by a dynamic adaptive steaming over Hypertext Transfer Protocol (DASH) client of user equipment UE and that is used to request segment content of media;
a processor, configured to determine, according to the segment request message received by the receiver, to send the segment content to the UE in a multicast mode; and
a transmitter, configured to send a multicast request message to a broadcast multicast service center (BM-SC), so that the BM-SC multicasts the segment content to a multimedia broadcast multicast service (MBMS) client according to the multicast request message, and the MBMS client sends the segment content to the DASH client,
wherein the multicast request message carries IP address information of the UE, used by the BM-SC to determine an object to which the segment content is multicast, identifier information of the segment content, used by the BM-SC to determine the segment content, and a media presentation description MPD of the media, used by the BM-SC to determine a user service description USD and file delivery table (FDT) instance information of the media.

11. The apparatus according to claim 10, wherein the receiver is further configured to receive multicast transmission information, sent by the BM-SC according to the multicast request message, of the segment content; and
the transmitter is further configured to send a segment multicast instruction message to the DASH client, wherein the segment multicast instruction message carries the multicast transmission information received by the receiver, and the segment multicast instruction message is used to instruct the DASH client to receive the segment content by using the MBMS client.

12. The apparatus according to claim 11, wherein the multicast transmission information received by the receiver comprises at least one of the following information: information about a frequency band occupied by multicast of the segment content, a service identifier of the multicast segment content, an MBMS session identifier of the multicast segment content, a transport identifier of the multicast segment content, a transport session identifier of the multicast segment content, a service area in which the segment content is multicast, and scheduling information of the multicast segment content.

13. The apparatus according to claim 10, wherein the processor is specifically configured to: when a quantity of segment request messages that are received by the receiver and that are used to request segment content of the media exceeds a preset threshold, determine to send the segment content to the UE in a multicast mode.

14. An apparatus for media stream transmission, comprising:
a receiver, configured to receive a multicast request message that is sent by a dynamic adaptive steaming over Hypertext Transfer Protocol (DASH) proxy when the DASH proxy receives a segment request message that is sent by a DASH client of user equipment UE and that is used to request segment content of media, wherein the multicast request message is used to request a broadcast multicast service center (BM-SC) to multicast the segment content of the media to a multimedia broadcast multicast service (MBMS) client of the UE, wherein the multicast request message carries IP address information of the UE, used by the BM-SC to determine an object to which the segment content is multicast, identifier information of the segment content, used by the BM-SC to determine the segment content, and a media presentation description MPD of the media, used by the BM-SC to determine a user service description USD and file delivery table (FDT) instance information of the media;
a processor, configured to acquire the segment content according to the multicast request message received by the receiver the processor is further configured to determine a user service description (USD) and file delivery table (FDT) instance information of the media according to the multicast request message received by the receiver; and
a transmitter, configured to send the USD and the FDT instance information that are determined by the processor to the MBMS client, and multicast, to the MBMS client, the segment content acquired by the processor, so that the MBMS client receives the segment content according to the USD and the FDT instance information.

15. The apparatus according to claim 14, wherein the processor is further configured to: before the transmitter multicasts the segment content to the MBMS client, determine multicast transmission information of the segment content; and
the transmitter is further configured to send, the multicast transmission information determined by the processor to the DASH proxy, so that the DASH proxy sends the multicast transmission information to the DASH client, and the DASH client uses the multicast transmission information to request the segment content from the MBMS client.

16. An apparatus for media stream transmission, comprising:
a transmitter, configured to send, to a dynamic adaptive steaming over Hypertext Transfer Protocol (DASH) proxy, a segment request message used to request segment content of media; and
a receiver, configured to receive a segment multicast instruction message that is sent by the DASH proxy according to the segment request message sent by the transmitter, wherein the segment multicast instruction message carries multicast transmission information of the segment content, and the segment multicast instruction message is used to instruct the DASH client to receive the segment content by using a multimedia broadcast multicast service (MBMS) client, wherein
the transmitter is further configured to send a segment transfer request message to the MBMS client according to the segment multicast instruction message received by the receiver, wherein the segment transfer request message carries the multicast transmission information; and
the receiver is further configured to receive the segment content sent by the MBMS client according to the segment transfer request message sent by the transmitter,
wherein the segment multicast instruction message carries IP address information of a user equipment (UE) to determine an object to which the segment content is multicast, identifier information of the segment content to determine the segment content, and a media presentation description MPD of the media to determine a user service description USD and file delivery table (FDT) instance information of the media.

17. An apparatus for media stream transmission, comprising:
a first receiver, configured to receive a user service description (USD) and file delivery table (FDT) instance information of media that are sent by a broadcast multicast service center BM-SC;
a second receiver, configured to receive segment content of the media according to the USD and the FDT instance information that are received by the first receiver;
a third receiver, configured to receive a segment transfer request message sent by a dynamic adaptive steaming over Hypertext Transfer Protocol DASH client, wherein the segment transfer request message carries multicast transmission information of the segment content received by the second receiver that includes IP address information of user equipment (UE), used by the BM-SC to determine an object to which the segment content is multicast, identifier information of the segment content, used by the BM-SC to determine the segment content, and a media presentation description MPD of the media, used by the BM-SC to determine the USD and the FDT instance information of the media; and
a transmitter, configured to send, to the DASH client according to the multicast transmission information carried in the segment transfer request message received by the third receiver, the segment content received by the second receiver.

18. User equipment, comprising:
a transmitter, configured to send to a dynamic adaptive steaming over Hypertext Transfer Protocol (DASH) proxy, a segment request message used to request segment content of media; to receive a segment multicast instruction message that is sent by the DASH proxy according to the segment request message, wherein the segment multicast instruction message carries multicast transmission information of the segment content, and the segment multicast instruction message is used to instruct the DASH client to receive the segment content by using a multimedia broadcast multicast service (MBMS) client; send a segment transfer request message to the MBMS client according to the segment multicast instruction message, wherein the segment transfer request message carries the multicast transmission information; and receive the segment content sent by the MBMS client according to the segment transfer request message; and
a receiver configured to receive a user service description (USD) and file delivery table (FDT) instance information of media that are sent by a broadcast multicast service center BM-SC; to receive segment content of the media according to the USD and the FDT instance information that are received by a first receiver; to receive the segment transfer request message sent by the DASH client; to send to the DASH client according to the multicast transmission information carried in the segment transfer request message, the segment content received,
wherein the segment multicast instruction message carries IP address information of the user equipment, used by the BM-SC to determine an object to which the segment content is multicast, identifier information of the segment content, used by the BM-SC to determine the segment content, and a media presentation description MPD of the media, used by the BM-SC to determine the USD and the FDT instance information of the media.

* * * * *